(12) United States Patent
Patterson

(10) Patent No.: US 6,984,327 B1
(45) Date of Patent: Jan. 10, 2006

(54) SYSTEM AND METHOD FOR SEPARATING HEAVY ISOTOPES OF HYDROGEN OXIDE FROM WATER

(76) Inventor: James A. Patterson, 2612 Tanglewood Dr., Sarasota, FL (US) 34239

( * ) Notice: Subject to any disclaimer, the term of this patent is extended or adjusted under 35 U.S.C. 154(b) by 77 days.

(21) Appl. No.: 10/997,676

(22) Filed: Nov. 23, 2004

(51) Int. Cl.
  *B01D 61/20* (2006.01)
  *C02F 1/42* (2006.01)
(52) U.S. Cl. .................. 210/638; 210/184; 210/269; 210/321.87; 210/500.23; 210/651; 210/663; 210/774; 423/580.2
(58) Field of Classification Search ............... 210/184, 210/186, 193, 259, 266, 269, 637, 638, 644, 210/651, 663, 669, 670, 673, 682, 774, 777, 210/778, 209, 210, 321.87, 497.01, 500.23; 423/580.2
See application file for complete search history.

(56) References Cited

U.S. PATENT DOCUMENTS

| | | | |
|---|---|---|---|
| 3,771,234 A | 11/1973 | Forster et al. | |
| 3,944,485 A | 3/1976 | Rembaum et al. | |
| 3,977,089 A | 8/1976 | Forster et al. | |
| 4,010,108 A | 3/1977 | Gablin et al. | |
| 4,023,279 A | 5/1977 | Janda | |
| 4,055,001 A | 10/1977 | Forster et al. | |
| 4,085,061 A | 4/1978 | O'Brien | |
| 4,126,667 A | 11/1978 | Butler et al. | |
| 4,138,329 A | 2/1979 | Kita | |
| 4,143,123 A | 3/1979 | Butler et al. | |
| 4,190,515 A | 2/1980 | Butler et al. | |
| 4,205,459 A | 6/1980 | Koseki et al. | |
| 4,222,176 A | 9/1980 | Tjurin et al. | |
| 4,269,716 A | 5/1981 | Gurian | |
| 4,274,962 A | 6/1981 | Queiser et al. | |
| 4,322,394 A | 3/1982 | Mezey et al. | |
| 4,330,946 A | 5/1982 | Corneya | |
| 4,363,757 A | 12/1982 | Koster et al. | |
| 4,414,113 A * | 11/1983 | LaTerra | 210/636 |
| 4,424,903 A | 1/1984 | Knieper et al. | |
| 4,519,996 A | 5/1985 | Knochel et al. | |
| 4,564,515 A | 1/1986 | Mandrin | |
| 4,567,340 A | 1/1986 | Latchum | |
| 4,601,114 A | 7/1986 | Noguchi | |
| 4,687,644 A | 8/1987 | Iniotakis et al. | |
| 4,705,635 A | 11/1987 | Knochel et al. | |
| 4,805,317 A | 2/1989 | Inglis et al. | |
| 4,861,490 A | 8/1989 | Morris | |
| 4,976,866 A | 12/1990 | Grinstead et al. | |
| 5,006,258 A | 4/1991 | Veatch et al. | |
| 5,108,616 A | 4/1992 | Kunz | |
| 5,176,885 A | 1/1993 | Impink et al. | |
| 5,191,721 A | 3/1993 | Incorvia et al. | |
| 5,192,445 A | 3/1993 | Bartels | |
| 5,248,435 A | 9/1993 | Morita et al. | |
| 5,354,476 A | 10/1994 | Kubo et al. | |

(Continued)

Primary Examiner—Joseph Drodge
(74) Attorney, Agent, or Firm—Charles J. Prescott

(57) ABSTRACT

An apparatus and method for separating heavy isotopes of hydrogen from contaminated water. The apparatus includes a treatment chamber with an elongated hollow core fiber (HCF) extending within the chamber. A reservoir holds contaminated water mixed with beads formed of an exchange resin, the mixture of contaminated water and beads forming a flowable slurry. The slurry is continuously circulated through the hollow core fiber and the reservoir preferably by a pulsating peristaltic pump. The beads absorb a portion of the heavy isotopes from the slurry by exchange with waters of hydration of the beads while the hollow core fiber allows permeation of only light water from said slurry outwardly through the HCF wall as a permeate.

19 Claims, 1 Drawing Sheet

U.S. PATENT DOCUMENTS

| | | |
|---|---|---|
| 5,377,234 A | 12/1994 | Robles et al. |
| 5,411,712 A | 5/1995 | Woodmansee et al. |
| 5,429,665 A | 7/1995 | Botich |
| 5,451,322 A | 9/1995 | Nelson et al. |
| 5,464,530 A | 11/1995 | Stivers |
| 5,581,903 A | 12/1996 | Botich |
| 5,595,666 A | 1/1997 | Kochen et al. |
| 5,702,608 A | 12/1997 | Foos et al. |
| 5,732,562 A | 3/1998 | Moratalla |
| 5,736,052 A | 4/1998 | Concklin |
| 5,954,968 A | 9/1999 | Patterson |
| 6,110,373 A | 8/2000 | Patterson et al. |
| 6,153,092 A | 11/2000 | Patterson et al. |
| 6,348,153 B1 | 2/2002 | Patterson et al. |
| 6,517,708 B1 | 2/2003 | Patterson et al. |
| 6,632,367 B1 * | 10/2003 | Furlong et al. ............. 210/673 |

* cited by examiner

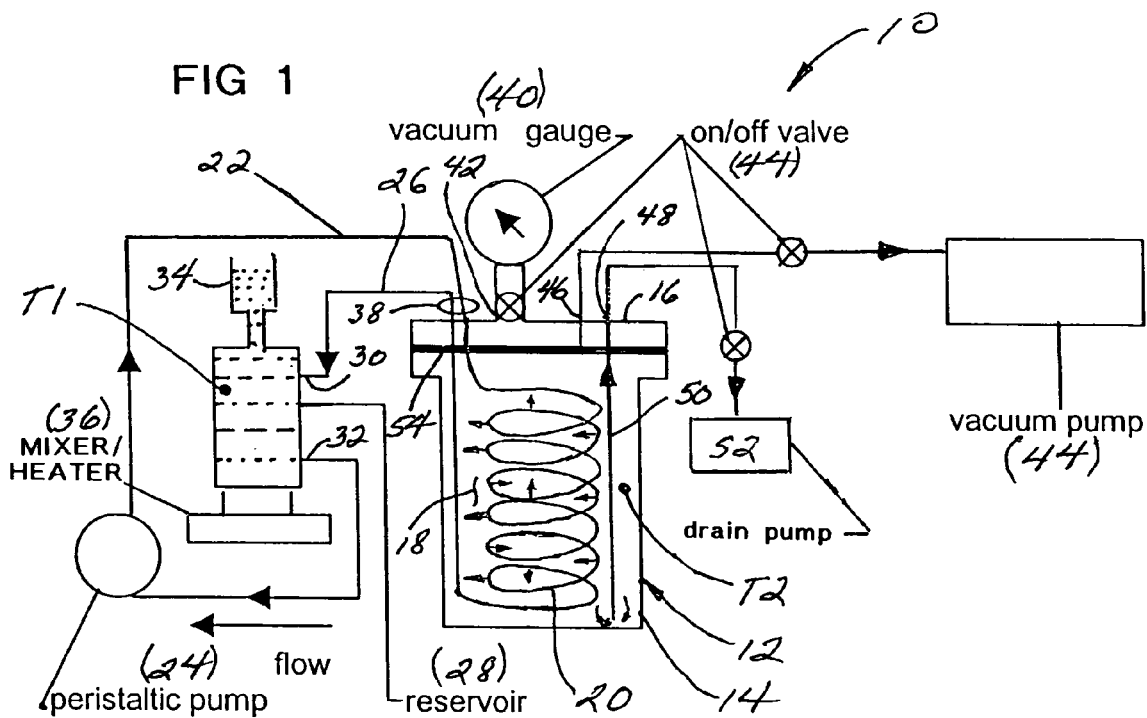
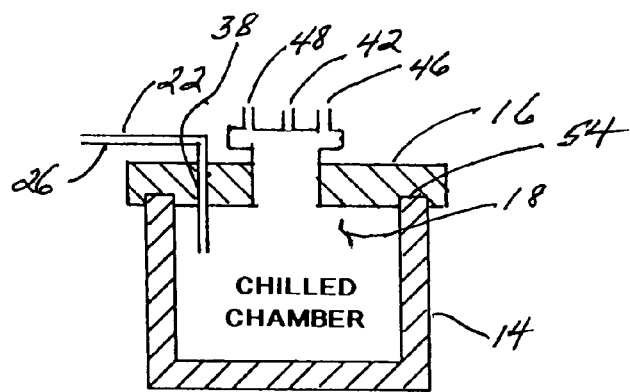
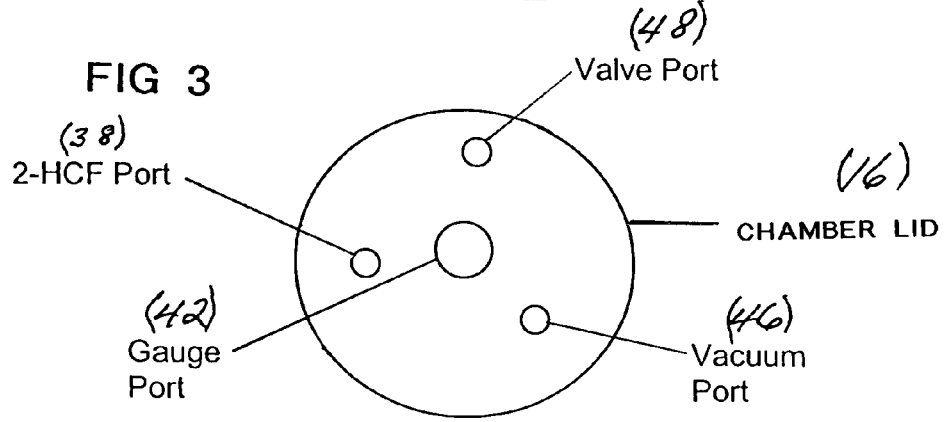

SYSTEM AND METHOD FOR SEPARATING HEAVY ISOTOPES OF HYDROGEN OXIDE FROM WATER

CROSS-REFERENCE TO RELATED APPLICATIONS

Not applicable

STATEMENT REGARDING FEDERALLY SPONSORED RESEARCH OR DEVELOPMENT

Not applicable

INCORPORATION-BY-REFERENCE OF MATERIAL SUBMITTED ON A COMPACT DISC

Not applicable

BACKGROUND OF THE INVENTION

1. Field of the Invention

This invention relates generally to the separation of oxides of heavy isotopes of hydrogen, and in particular to a process and apparatus for separating deuterium oxide (HDO, $D_2O$), tritium oxide (HTO, $D_2O$) and oxides of deuterium and tritium (DTO) from light water ($H_2O$) contaminated with heavy isotopes of water. In addition, this process addresses separation of heavy water isotopes, e.g. DTO from $D_2O$, and HTO from $D_2O$.

2. Description of Related Art

Nuclear power plants must routinely deal with the replacement and disposal of contaminated water taken from the core reactor that is laden with heavy isotopes of hydrogen, namely deuterium oxides, tritium oxides and deuterium-tritium oxides. Tritium in particular is highly radioactive having a half-life of about twelve and one half years emitting beta rays to form helium.

Periodically, the contaminated water from nuclear reactors must be replaced. It has become industry practice of dispose of the old contaminated water by simply dispersing it over adjacent ground areas or evaporating the contaminated water into the atmosphere. This is stressful to the environment as the deuterium oxides and tritium oxides are now known to have contaminated ground water sources. One alternative is to sequester contaminated water in concrete at a considerable expense.

In accordance with the teaching in U.S. Pat. No. 6,348, 153 by Patterson, et al., a process and related apparatus are described for separating deuterium oxide (HDO, $D_2O$) and tritium oxide (HTO, $T_2O$), i.e. heavy water and tritiated water, and deuterium-tritium oxides, from wastewater. As used herein, water molecules of the formula $H_2O$ will be referred to as light water molecules, or simply water molecules, while water molecules in which one or both of the hydrogen atoms have been replaced by one of these hydrogen isotopes will be referred to as isotope water molecules or isotope molecules.

In the described prior art process, a portion of the isotope water molecules are removed from contaminated water, i.e., water containing a small amount of isotope water molecules, through selective adsorption by contacting the contaminated water with a molecular separation material containing hydration sites carrying one or more associated waters of hydration. In the process, isotope water molecules present in the contaminated water selectively replace a portion of the waters of hydration associated with the hydration sites. The molecular separation material can then be separated from the water, reducing the percentage of isotope molecules in the water. After separation, the molecular separation material can be regenerated by removing the isotope molecules for long-term storage, and reused repeatedly to separate isotope molecules.

In order to improve the efficiency of the selective adsorption process, the percentage of isotope molecules in the contaminated water can be increased, thereby increasing the exposure of isotope molecules to hydration sites, by removing a portion of the light water molecules, before or during the selective adsorption, by bringing the contaminated water into contact with a porous film or membrane that exhibits a greater permeability for light water molecules than for the larger isotope molecules. For some purposes, adequate separation may be effected through membrane separation alone.

The Molecular Separation Material

Generally, the molecular separation material as taught in the '153 patent is comprised of a support medium having a plurality of hydration sites, i.e., sites with associated waters of hydration. The effectiveness of the molecular separation material is determined by the number of hydration sites exposed to the contaminated water, and to the number of waters of hydration at each site. The support medium used to carry the hydration sites is not critical to the invention so long as exposure of the contaminated water to numerous sites containing multiple waters of hydration is provided. In general, this objective is preferably achievable with a high surface area support medium having a plurality of hydration attachment sites.

The support medium or medium may be, for example, a polymer, such as polystyreneldivinyl benzene (PSDVB), or polyacrylicdivinyl benzene (PADVB). These polymers are commonly used as supports in ion exchange resins in the preparation of ion exchange resins. The polymer may be functionalized for example, by being sulfonated or phosphonated to provide the sites for attachment of metal or other cations with the required associated waters of hydration. Both strong and weak acid resins have been shown to be effective.

It is important to note that the '153 patent teaching involves the preferential adsorption or substitution of the waters of hydration associated with the hydration sites, and not the replacement of the cation or anion as is normally practiced in using this type of resin. Thus, while the resins employed are referred to in some instances as ion exchange resins, since this is the purpose for which they are commonly employed, their function in the present invention is to facilitate molecular exchange of isotope water molecules with the associated light water molecules attached to the hydration sites.

It also became apparent that other materials having a large surface area and hydration sites could be used. That is, the '153 invention involves the interaction between the hydration sites and the isotope molecules, in which one or more light water molecules initially associated with a hydration site are replaced by isotope molecules in the contaminated water. Thus, the support medium serves essentially as a carrier for the hydration sites. Thus, various high surface area materials can be used, so long as they are water insoluble and provide a large number of accessible hydration sites. For example, the support medium can be other kinds of synthetic polymers, or natural materials, such as zeolites, aluminas, silicas, etc.

Each hydration site has at least one, and preferably from about 7 to about 25 waters of hydration and even higher up to almost 50 waters of hydration. Various molecules that form associations with water molecules, i.e., waters of hydration can be used in the present invention. The cationic portion of the hydration site may be nonmetallic, e.g., an ammonium cation ($NH_4+$), or a metallic cation. Of the metal cations, aluminum is especially suitable due to the large number of waters of hydration associated with aluminum salts. However, other cations, such as sodium, magnesium, copper, zinc, cobalt, iron, nickel, manganese, potassium or chromium can also be employed. Depending upon the structure of the support and the manner of its production, the anionic portion of the hydration site molecule can include nitrates, sulfates, chlorides, acrylates, hydroxides, or phosphates. Moreover, a broad array of physical constants for inorganic compounds having varying waters of hydration are to be found in reference handbooks such as *Handbook of Chemistry*, N. A. Lange, Ph.D. Revised 90th Edition, or *CRC Handbook of Chemistry and Physics*, D. R. Lide, Ph.D., 77th Edition.

The molecular separation material was taught to be in various physical forms, so long as a large surface area with hydration sites is exposed to the contaminated water. For ease of manufacture and subsequent regeneration, and the availability of a large surface area, the molecular separation material is preferably in the particulate form., e.g. beads of from about 15 mesh to about 400 mesh. Other physical forms, such as gels, can also be used.

The Separation Membrane

Separation of the isotopes was also be affected with the use of a separation membrane, or a separation membrane may be used simultaneously, or in sequence with selective adsorption. Suitable separation membranes have a porosity that is selective for light water molecules. That is, the membrane will allow a greater percentage of light water molecules than isotope water molecules to pass through the membrane when the contaminated water is placed against one side of the membrane. The separation membrane may be formed of various materials, such as cellulose acetate.

When used, the waste or contaminated water is passed against one side of the membrane surface, causing light water molecules, and a relative small percentage of isotope water molecules to pass through the membrane wall. As a result, the percentage of isotope water in the remaining contaminated water is increased. Therefore, the membrane can be used alone to reduce the volume of the contaminated water for subsequent storage, or to concentrate the isotope for treatment with the above-described molecular separation material.

The separation membrane may be positioned for contact with the contaminated water in various ways known to one skilled in the art of using separation membranes, so long as the contaminated water can be conveyed on one side of the membrane, with the light water molecules being permitted to pass through the membrane to the opposite side. Other conditions being the same, the permeation rate of the membrane is directly proportional to the surface area of membrane exposed to the contaminated water.

A preferred configuration for purposes of the '153 invention is to use a separation membrane in the form of one or more hollow fibers, with the contaminated water being passed through the interior of these fibers. As a result, the light water molecules preferentially pass through the walls of the fibers to the exterior of the fibers for collection.

The separation membrane may be used in combination with the above molecular separation material for sequential or simultaneous water treatment. For example, the contaminated water may be first exposed to the separation membrane to remove a portion of the light water, thereby concentrating the contaminated water stream. The concentrated stream can then be exposed to the molecular separation material, thereby increasing the effectiveness of the molecular separation, since the isotopes comprise a relatively higher percentage of the waste stream.

Alternatively, the contaminated water may be simultaneously subjected to membrane and molecular separation. For example, the membrane can be in tubular form, e.g., lengths of hollow core fiber, and the molecular separation material can be packed into the interior of fiber or tube. The contaminated water can then be conveyed through lengths of the filled tube or hollow core fiber, discharging substantially purified water therefrom with the isotope water molecules, i.e., the oxides of heavy isotopes of hydrogen, being held or trapped within the tube or hollow core fiber for appropriate disposal or regeneration.

Thus, in one embodiment of the prior art '153 teaching, the heavy water or tritiated water content of a contaminated water stream is reduced by exposing the stream to a single elongated length or a bundle of hollow core fibers, each of which is at least partially filled or packed with beads of an exchange resin, or other molecular separation material.

Apparatus and Process

The configuration of the apparatus used to practice the process of the '153 patent will vary depending on whether the molecular separation material, the separation membrane, or both, are used. The exact nature of the apparatus will also depend upon the volume of water being treated, the manner of disposal of the water discharge streams, and whether or not the molecular separation material, if used, is to be regenerated.

In general, however, the '153 apparatus included at least one separation chamber, a supply conduit for conveying contaminated water into the separation chamber from a supply source, and a first discharge conduit for removing treated contaminated water from the separation chamber. For example, when the molecular separation material is used alone, the apparatus may include a separation chamber to hold the molecular separation material, a conduit to feed contaminated water into the separation chamber from a supply source, and a discharge conduit for removing treated water from which a portion of the isotope molecules has been removed. Provision may also be made for periodic replacement of the molecular separation material.

The '153 apparatus also included a means for regeneration of the molecular separation material to remove adsorbed isotope molecules and regular water molecules. For example, the loaded molecular separation material can be placed in a heated chamber to drive off the isotope molecules and the light water molecules by evaporation. This desorbed or dehydrated molecular separation material can then be used directly, or rehydrated with light water molecules prior to use.

When the separation membrane was used alone, the apparatus will also include a separation chamber in which the contaminated water is passed on one side of the membrane. The apparatus also included a supply conduit, a first discharge conduit for conveying the treated water passing through the membrane, and a second conduit for conveying the remaining concentrated water. When the separation membrane is in tubular form such as a hollow fiber, the first discharge conduit is in communication with the exterior of the tubes or fibers, while the second discharge conduit is in communication with the interior of the tubes or fibers.

BRIEF SUMMARY OF THE INVENTION

The present invention is directed to an apparatus and method for separating heavy isotopes of hydrogen from contaminated water. The apparatus includes a treatment chamber with an elongated hollow core fiber (HCF) extending within the chamber. A reservoir holds contaminated water mixed with beads formed of an exchange resin, the mixture of contaminated water and beads forming a flowable slurry. The slurry is continuously circulated through the hollow core fiber and the reservoir, preferably by a pulsating peristaltic pump. The beads absorb a portion of the heavy isotopes from the slurry by exchange with waters of hydration of the beads while the hollow core fiber allows permeation of only light water from said slurry outwardly through the HCF wall as a permeate.

It is therefore an object of this invention to provide an environmentally safe alternative to the ground or air dispersion of water contaminated with heavy isotopes of hydrogen.

It is yet another object of this invention to provide means for separating heavy isotopes of hydrogen from light water ($H_2O$) and tritiated water from heavy water.

It is another object of the invention to provide a process for separating isotope molecules from water by contacting the water with a molecular separation material

BRIEF DESCRIPTION OF THE DRAWINGS

FIG. 1 shows the treatment system including treatment chamber, reservoir and molecular separation membrane.

FIG. 2 is a schematic view of the treatment chamber of FIG. 1.

FIG. 3 is a top plan view of the lid of FIG. 2.

DETAILED DESCRIPTION OF THE INVENTION

Referring now to the drawings, the preferred apparatus of the present invention is shown generally at numeral 10 in FIG. 1 and includes a sealable treatment chamber 12, a reservoir 28 for holding a quantity of contaminated water formed as a flowable slurry with a quantity of molecular separation material and a molecular separation membrane 20 preferably in the form of a length of tubular flexible hollow core fiber material.

As seen in FIG. 2, the treatment chamber 12 includes an insulated well 14 and an insulated chamber lid 16, the top of which is shown in FIG. 3. The interior 18 of the well 14 is preferably chilled as will be described in more detail herebelow. The lid 16 includes a gage port 42 into which a vacuum gauge 40 is connected for monitoring the static pressure within the interior 18 of the chamber 12. Two hollow core fiber (HCF) ports 38 are also provided within the chamber lid 16 along with a valve port 48 and a vacuum port 46. A sealing member 54, preferably in the form of an elastomeric o-ring, is provided so that when the chamber lid 16 is attached in place, the interior volume 18 is sealed. One end of the length of hollow core fiber 20 coiled within the interior volume 18 is connected to an outlet 32 of the reservoir 28 by a conduit 22 while the other end of the hollow core fiber 20 is connected to an inlet 30 of the reservoir 28 by a separate conduit 26.

The reservoir 28 is filled with contaminated water which includes heavy isotopes of hydrogen in their oxide forms, namely tritium oxide ($T_2O$) and deuterium oxide ($D_2O$). To the contaminated water within the interior of reservoir 28, sometimes referred to as "media" herein, is added a quantity of loose molecular separation material preferably in the form of beads formed of an ion exchange resin as will be described more fully herebelow. The combination of the contaminated water and the molecular separation material forms a flowable slurry which is maintained in a substantially homogenously formed mixture by a mixer/heater 36 positioned below the reservoir 28.

A peristaltic pump 24 is operably connected at outlet 32 and conduit 22 to the first end of the hollow core fiber 20 and serves to continuously circulate the slurry of contaminated water and molecular separation material between the reservoir 28 and the hollow core fiber 20. A peristaltic-type pump is preferred to effect the continuous flow of the slurry due to the fact that this type of pump produces pressure pulsations within the hollow core fiber 20, typically 5 to 10 psi above ambient, which has been found to enhance the capillary flow of light water ($H_2O$) outwardly through the wall of the hollow core fiber 20 as will be described herebelow and shown by the arrows within the interior volume 18 of the chamber 12.

In this preferred embodiment 10, a vacuum pump 44 is operably connected through vacuum port 46 of chamber lid 16 to the interior volume 18. This vacuum pump 44 as controlled by one of the on/off valves 44, produces a static vacuum pressure within the interior volume 18 of about 30" Hg for enhanced osmotic flow of $H_2O$ through the walls of the hollow core fiber 20. As $H_2O$ accumulates within the interior volume 18 and exterior to the hollow core fiber 20, a drain pump 52 in fluid communication with an upright drain tube 50 within the interior volume 18 through vacuum port 48 removes the accumulation of $H_2O$ as the system requires.

Again, in the preferred embodiment 12, the interior volume 18 is monitored for temperature at T2 and is chilled to a temperature in the range approaching the freezing temperature of $D_2O$ in the slurry. The slurry temperature in the reservoir 28 is monitored at T1 and is elevated by the mixer/heater 36 to a temperature in the range approaching the boiling point of $T_2O$ in the slurry. The details and benefits of this temperature differential are described more fully herebelow.

Thus, the apparatus 10 provides a means for the continuous flow and recirculation of a slurry from the reservoir 28 into the treatment chamber 12 and through the hollow core fiber 20 contained therein and returning to the reservoir. Molecular separation occurs partially in the form of $H_2O$ passing from the interior of the hollow core fiber 20 in the direction of the arrows into the interior volume 18 by capillary action as controlled by the pore size of the hollow core fiber which is selected to only allow the smaller $H_2O$ molecules to pass therethrough. The molecular separation material absorbs by exchange and becomes saturated with $T_2O$ while the $D_2O$ remains within the contaminated liquid.

By this means, each of the components within the contaminated water are separated for removal and proper disposal thereof.

Simplistic diagrams of the process of molecular separation of the various components of tritium and deuterium in their oxide forms from contaminated water is shown herebelow. Resin particles mixed with the contaminated water have a general formula as shown as follows:

$$R\ SO_3H\ X\ H_2^{1,2,3}O$$

During flow of the slurry containing the contaminated water through the separation membrane 20, the slurry will typically have the chemical appearance of a homogeneous admixture as shown herebelow. Note that pressure within the slurry pressure pulsates as a result of the pumping action of the peristaltic pump 24.

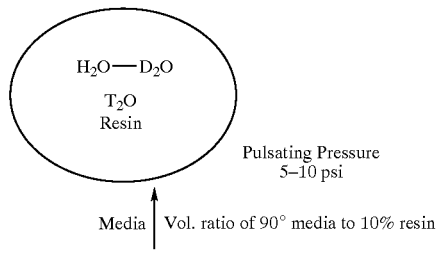

During periods of higher pressure within the flowing slurry, in HOH is squeezed from the resin while DOD and TOT are forced into the resin on a molecular exchange basis as shown herebelow:

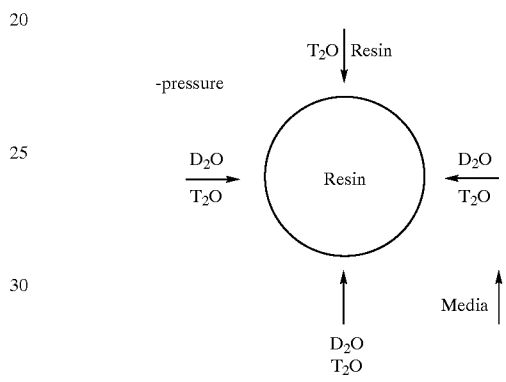

During periods of cyclic lower pressure within the slurry, the hydration sites vacated by the $H_2O$ squeezed from the resin are filled with $D_2O$ and $T_2O$ as shown herebelow.

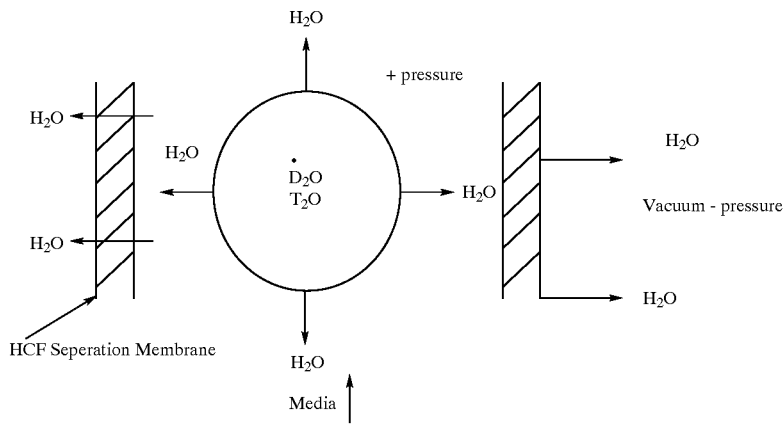

During periods of higher pulsating pressure within the tubular HCF separation membrane as shown herebelow, the $H_2O$ permeates outwardly through the walls of the HCF separation membrane as facilitated by the vacuum or negative pressure within the treatment chamber and exterior to the HCF separation membrane.

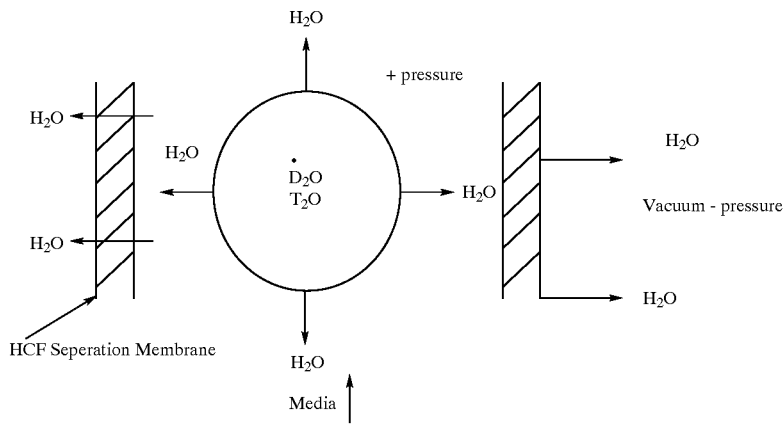

The slurry changes character as $H_2O$ permeates outwardly from the walls of the HCF separation membrane into the interior of the treatment chamber to a point where the DOD build-up in the media which cannot permeate through the walls of the HCF separation membrane because of increased molecular size, builds in concentration up to a point sufficient for membrane penetration potential. This is demonstrated as shown herebelow. Note that the HOH or ($H_2O$) purity is extremely high with no dissolved molecules or particles contained therein after leaving the HCF separation membrane.

The test ratio selected between the volume of the contaminated water and the quantity of resin by volume is a ratio of 9:1. The exchange resin selected is a 2% cross-linked resin of sulfonated styrene divinyl benzene having a bead size of between 100 and 400 mesh. Add further details of resin by referenced herebelow. Determination of test progress during laboratory testing of the invention was accomplished primarily by observing the freezing point of the slurry. The freezing point of $H_2O=0.0°$ C.: $T_2O=8.0°$ C.: $D_2O=3.82°$ C.

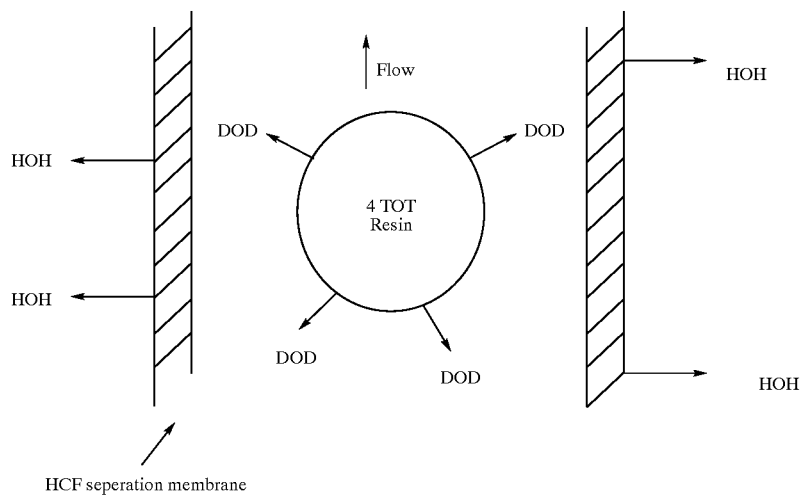

Preferred Resin

The preferred ion exchange resin is small enough in the hydrated state to pass through the tubular hollow core fiber separation membrane at an operational flow rate and mediate temperature and hollow core fiber length to provide a desired back pressure to maintain the defined flow rate in the range of 11 ml/min. The resin may be either formed of ground particles or spherical particles having a maximum hydrated diameter of 10% of the inside diameter of the hollow core fiber separation membrane. The ionic nature of the resin should be that of a cross-linked divinyl benzene polystyrene in the sulfonated form, preferably also in the hydrogen form; however, the resin may be ionic, highly hydrated species of a cation salt. The cross linking preferred is that of the divinyl benzene but the cross linking may be that of a polyvalent cation. the nominal cross linking of the resin should be in the range of 0.1% to 10%. The volume ratio of aqueous media to hydrated resin has an upper volume ratio of 5:1 to 20:1; however, the preferred volume ration of contaminated water to resin is 9:1.

Laboratory Parameters

The test slurry was made up of blended contaminated water containing 99.95% pure $H_2O$ and 0.5% DOD. The total volume of the slurry before the addition of the molecular separation material, i.e. microbeads formed of an ion exchange resin, was established at 50 ml. The total volume within the interior of a length of 300' of HCF separation membrane is approximately 46.3 ml., 87.8' of which is coiled within the treatment chamber. The total volume of the reservoir and the HCF separation membrane is 71.4 ml.

To quickly determine the level or concentration of $D_2O$ in the slurry, a Model 5600 Cryoscope manufactured by Advanced Instruments, Inc. of Norwood, Mass. was utilized for this purpose. This equipment estimates the freezing point of a liquid by determining the "osmolality" thereof. The readings from this equipment are provided in a four-digit number indicative of the freezing point of that material based on the osmolality number. For example, the following osmolality numbers for $D_2O$ as a percentage of deuterium in $H_2O$ are as follows:

TABLE A

| % $D_2O$ in $H_2O$ | Osmolality |
| --- | --- |
| 0.000–0.001 | 2207 |
| 0.01 | 2208 |
| 0.05 | 2210 |
| 0.10 | 2212 |
| 0.50 | 2224 |
| 0.51 | 2225 |

By maintaining the temperature of the interior 18 at T2 at or below the approximate freezing point of water and monitoring the freezing point of the slurry passing through the hollow core fiber 20, measurement of the freezing point of the slurry will provide an estimate of the percentage of $D_2O$ within the slurry as separation progresses during the continuous recycling of the slurry between the reservoir 28 and the hollow core fiber membrane 20.

Boiling Temperature

The boiling temperature of $H_2O=100°$ C.; $D_2O=101.42°$ C.; $T_2O=103°$ C. By heating the reservoir 28 as monitored at T1 of the slurry therewithin and elevating the temperature by the mixer/heater 36 to maintain the temperature T1 of the slurry within the reservoir 28 in the range of approaching the boiling point of $T_2O$, exchange of waters of hydration on the resin with the $T_2O$ is enhanced.

The flow rate maintained during lab testing of the present invention was approximately 11.2 ml/min. and with a total system volume of approximately 71.4 ml., a complete cycle of slurry circulation through the system occurred in approximately 6.4 minutes.

EXAMPLE 1

DOD-HOH contaminated water samples having a relative freezing point of 2211 osmolality representing a 0.045% of DOD was mixed with a quantity of substantially pure $H_2O$ having a freezing point of 2207. A quantity of divinylbenzene polystyrene sulfonic acid ($RSO_3H$) was mixed with the contaminated water in a volume ratio of 10% resin: 90% contaminated water. The resin had a maximum hydration size of 100$\mu$ from the reservoir. A total of 300' of hollow HCF molecular membrane material having an average 1.0 of 1.3 mm and a wall thickness of 2 mm was loaded into the treatment chamber. The slurry containing the contaminated media and the resin were circulated by the peristaltic pump at a flow rate of 2.0 ml./min. at a chamber vacuum pressure of approximately 30" Hg as monitored by the vacuum gauge 40. The interior of the reservoir 28 was measured at T1 to be 60° C.

The treatment chamber 12 was chilled to condense the $H_2O$ vapors which permeated outwardly through the walls of the HCF molecular membrane during a 48-hour run of the apparatus 10. The total condensed liquid measured 52.5 ml. The turbidity was measured and was found to be 0.001 NTU having a freezing point of 2206 osmolality which reflected the fact that a small quantity of the resin/media had leaked outwardly through the wall of the HCF molecular membrane before the test was stopped.

EXAMPLE 2

Another sample of contaminated water having a relative freezing point of 2217 osmolality representing a 0.045% volume ratio of $D_2O$ to $H_2O$ was run in a 10% slurry of 200 to 400 mesh resin being 2% cross-linked and in the hydrogen form. The time of slurry recycling was approximately 200 hours at a flow rate of approximately 11 ml/min. After 200 hours of continuous run time, the $H_2O$ content of the slurry was decreased while the freezing point of the slurry had increased to 2226 osmolality representing a concentration of $D_2O$ in the slurry of 0.50%, up from the initial 0.045%.

A 5 ml. sample of the slurry was placed on a porous filter component and 1000 psi of pressurized nitrogen was applied to the top of the resin column. Approximately 2 ml. of liquid effluent was squeezed and taken from the resin within the slurry. The removed liquid had a freezing point of 2245 osmolality which indicated that the content of the resin was 0.51% $D_2O$.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. An apparatus for separating heavy isotopes of hydrogen in their oxide forms from contaminated water comprising:
   a treatment chamber having a substantially closed interior and including an elongated hollow core fiber (HCF) having a first and a second end and extending within said chamber;
   a reservoir of contaminated water having the heavy isotopes of hydrogen and including a quantity of beads formed of an exchange resin, the mixture of contaminated water and said beads forming a flowable slurry;
   said first end in fluid communication with an outlet of said reservoir from which said slurry is pumped directly into said HCF, said second end also in fluid communication with an inlet of said reservoir whereby said slurry is recirculated through said HCF and said reservoir;
   said beads capable of absorbing a portion of the heavy isotopes of hydrogen from said slurry being circulated through said HCF by exchange with waters of hydration of said beads;
   said hollow core fiber capable of allowing permeation only of light water from said slurry outwardly through a wall of said HCF as a permeate into said treatment chamber a cold temperature source located so as to chill said chamber interior; and
   a heat source located so as to heat said reservoir.

2. An apparatus as set forth in claim 1, further comprising:
   a vacuum source in fluid communication with the interior of said chamber for reducing static pressure within said chamber.

3. An apparatus as set forth in claim 2, wherein: further comprising: structure for mixing said slurry in said reservoir to maintain a substantially homogeneous consistency of said slurry.

4. An apparatus as set forth in claim 1, wherein:
   a cold temperature source is operable such that interior is chilled to a temperature in the range of freezing temperature of $D_2O$ in said slurry;
   a heat source is operable such that reservoir is heated to a temperature in the range of boiling temperature of $T_2O$ in said slurry.

5. An apparatus as set forth in claim 1, further comprising:
   a peristaltic pump connected between said reservoir and said first end for producing fluid pressure pulsations within said HCF to enhance light water permeation of $H_2O$ outwardly through the wail of said HCF.

6. An apparatus as set forth in claim 1, further comprising:
   a drain for removal of light water ($H_2O$) from said chamber.

7. An apparatus as set forth in claim 1, wherein:
   said beads are in a size range of about 200–400 mesh.

8. A process for molecular separation of water from contaminates of heavy isotopes of hydrogen oxide contained with the water comprising the steps of:
   A. providing a source of contaminated water which includes the heavy isotopes of hydrogen;
   B. providing a treatment chamber including an elongated tubular molecular separation membrane therein that is selectively permeable to light water molecules relative to hydrogen isotope water molecules;
   C. mixing with the contaminated water a molecular separation material including a support medium carrying a plurality of hydration sites capable of association with waters of hydration to produce a flowable slurry and causing a portion of the hydrogen isotope water molecules in the contaminated water to attach to a portion of said hydration sites;

D. causing the slurry to circulate through said separation membrane to remove light water molecules from the contaminated water, thereby increasing the concentration of hydrogen isotope molecules in the contaminated water.

9. The process of claim 8, further comprising:

E. reducing static pressure within said chamber.

10. The process of claim 8, further comprising:

E. chilling the temperature of said slurry within the chamber to approximately the freezing temperature of $D_2O$ in said slurry;

F. heating the temperature of said slurry within said reservoir to a temperature in the range of the boiling temperature of $T_2O$ in said slurry.

11. The process of claim 10, further comprising:

G. mixing said slurry within said reservoir to maintain a substantially homogeneous consistency of said slurry.

12. The process of claim 8, further comprising:

E. providing a peristaltic pump for producing fluid pressure pulsations within said membrane to enhance permeation of $H_2O$ through said membrane.

13. An apparatus for separating $H_2O$ from heavy isotopes of hydrogen In their oxide forms all of which are in contaminated water comprising:

a treatment chamber having a substantially closed interior and including an elongated tubular molecular separation membrane having a first and a second end and extending within said chamber;

a reservoir of contaminated water having the heavy isotopes of hydrogen and including a quantity of molecular separation material including a support medium carrying a plurality of hydration sites capable of association with waters of hydration forming a flowable slurry;

said first end in fluid communication with an outlet of said reservoir from which said slurry is pumped into said membrane, said second end also in fluid communication with an inlet of said reservoir whereby said slurry is circulated through said membrane and said reservoir;

said separation material capable of absorbing a portion of the heavy isotopes of hydrogen from said slurry being circulated through said membrane by exchange with waters of hydration of said separation material;

said membrane capable of allowing permeation only of light water from said slurry outwardly through a wall of said membrane as a permeate into sold treatment chamber a cold temperature source located so as to chill said chamber interior; and a heat source located so as to heat said reservoir.

14. An apparatus as set forth in claim 13, further comprising:

a vacuum source in fluid communication with the interior of said chamber for reducing static pressure within said chamber.

15. An apparatus as set forth in claim 14:

further comprising: structure for mixing said slurry in said reservoir to maintain a substantially homogeneous consistency of said slurry.

16. An apparatus as set forth in claim 13 wherein:

a cold source is operable such that interior is chilled to a temperature in the range of freezing temperature of $D_2O$ in said slurry;

a heat source is operable such that reservoir is heated to a temperature in the range of boiling temperature of $T_2O$ in said slurry.

17. An apparatus as set forth in claim 13, further comprising:

a peristaltic pump connected between said reservoir and said first end for producing fluid pressure pulsations within said HCF to enhance light water permeation of $H_2O$ outwardly through the wall of said HCF.

18. An apparatus as set forth in claim 13, further comprising:

a drain for removal of light water ($H_2O$) from said chamber.

19. An apparatus as set forth in claim 13, wherein:

said beads are in a size range of about 200–400 mesh.

* * * * *